(12) United States Patent
Martin et al.

(10) Patent No.: US 8,087,610 B2
(45) Date of Patent: Jan. 3, 2012

(54) AIRCRAFT SHOCK STRUT HAVING FIXED UPPER BEARING

(75) Inventors: Dennis W. Martin, Woodinville, WA (US); Michael J. Meneghetti, Marysville, WA (US); William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 385 days.

(21) Appl. No.: 12/358,007

(22) Filed: Jan. 22, 2009

(65) Prior Publication Data

US 2010/0181423 A1     Jul. 22, 2010

(51) Int. Cl.
*B64C 25/58* (2006.01)
(52) U.S. Cl. .............................. 244/102 A; 244/102 SL
(58) Field of Classification Search ............. 244/100 R, 244/102 A, 102 R, 102 SL, 102 SS, 104 FP
See application file for complete search history.

(56) References Cited

U.S. PATENT DOCUMENTS

| | | | | |
|---|---|---|---|---|
| 2,378,712 A | * | 6/1945 | LaRaque | 267/64.15 |
| 3,652,040 A | * | 3/1972 | Hartel | 244/104 R |
| 3,997,133 A | * | 12/1976 | Fagan | 244/104 R |
| 4,007,894 A | * | 2/1977 | Hartel | 244/104 FP |
| 4,787,486 A | * | 11/1988 | Hrusch et al. | 188/289 |
| 4,821,983 A | | 4/1989 | Aubry et al. | |
| 4,907,760 A | | 3/1990 | Sealey et al. | |
| 5,148,896 A | | 9/1992 | Ralph | |
| 5,209,431 A | * | 5/1993 | Bernard et al. | 244/17.17 |
| 5,299,761 A | * | 4/1994 | Robin et al. | 244/102 SS |
| 5,908,174 A | | 6/1999 | Churchill et al. | |
| 2004/0111891 A1 | | 6/2004 | Serouart et al. | |
| 2007/0164151 A1 | * | 7/2007 | Luce | 244/100 R |
| 2007/0194172 A1 | * | 8/2007 | Luce et al. | 244/100 R |

OTHER PUBLICATIONS

Conway, H.G.; Landing Gear Design; Book; pp. 179-183; Chapman & Hall LTD( 37 Essex Street, W.C.2, London, 1958).

* cited by examiner

*Primary Examiner* — Benjamin P Lee
(74) *Attorney, Agent, or Firm* — Scott D. Wofsy; Edwards Wildman Palmer LLP

(57) ABSTRACT

An aircraft shock strut includes a cylinder and a piston movable within the cylinder. A lower bearing and an upper bearing provide sliding engagement between the cylinder and the piston. The upper bearing is fixed to the cylinder and provides sliding engagement with an outer surface the piston. An upper bearing that is fixed to the cylinder facilitates use of lighter weight materials for the cylinder without sacrificing durability.

18 Claims, 4 Drawing Sheets

US 8,087,610 B2

AIRCRAFT SHOCK STRUT HAVING FIXED UPPER BEARING

FIELD OF THE INVENTION

The present invention relates to aircraft shock struts for absorbing and damping shock forces, such as during landing, taxiing or takeoff, and particularly an aircraft shock strut having a fixed upper bearing.

BACKGROUND OF THE INVENTION

Shock absorbing devices are used in a wide variety of vehicle suspension systems for controlling motion of the vehicle and its tires with respect to the ground and for reducing transmission of transient forces from the ground to the vehicle. Shock absorbing struts are a common and necessary component in most aircraft landing gear assemblies. The shock struts used in the landing gear of aircraft generally are subject to more demanding performance requirements than most if not all ground vehicle shock absorbers. In particular, shock struts must control motion of the landing gear, and absorb and damp loads imposed on the gear during landing, taxiing and takeoff.

A shock strut generally accomplishes these functions by compressing a fluid within a sealed chamber formed by hollow telescoping cylinders, where at least two bearings provide for sliding engagement of the telescoping cylinders. Typically, the lower bearing is fixed to the outer cylinder and provides for sliding engagement with the inner cylinder or piston, while the upper bearing is fixed to and moves with the piston, providing for sliding engagement with the outer cylinder.

The fluid within the sealed chambers generally includes both a gas and a liquid, such as hydraulic fluid or oil. One type of shock strut generally utilizes an "air-over-oil" arrangement wherein a trapped volume of gas is compressed as the shock strut is axially compressed, and a volume of oil is metered through an orifice. The gas acts as an energy storage device, such as a spring, so that upon termination of a compressing force the shock strut returns to its original fully-extended length. Shock struts also dissipate energy by passing the oil through the orifice so that as the shock absorber is compressed or extended, its rate of motion is limited by the damping action from the interaction of the orifice and the oil.

Designers of aircraft landing gear are always looking for ways to improve design, performance, cost, etc, while dealing with issues related to wear and corrosion. One desirable improvement is reducing the overall weight of the shock strut within the landing gear. While some efforts have been made to incorporate lighter weight materials into shock struts, it has been the case that lighter weight materials are more susceptible to premature wear, thereby requiring frequent replacement and resulting in increased maintenance costs.

SUMMARY OF THE INVENTION

The present invention provides an aircraft shock strut wherein sliding engagement between the cylinder and piston is effected through use of an upper bearing that is fixed to the cylinder. Use of a fixed upper bearing facilitates use of a cylinder made from a lighter weight material without causing excessive or premature wearing of and/or damage to the cylinder. The aircraft shock strut may provide weight reduction without sacrificing durability.

Thus, an aircraft shock strut according to one aspect of the invention is characterized by a cylinder, a piston telescopically movable within the cylinder and a lower bearing and an upper bearing, where the lower and upper bearings provide sliding engagement between the cylinder and the piston. The upper bearing is fixed to the cylinder and has a bearing surface that provides sliding engagement with the piston.

According to another aspect of the invention, there is provided a method of reducing weight of an aircraft landing gear that includes at least one shock strut, where at least one shock strut includes a cylinder and a piston telescopically movable within the cylinder. The method includes providing a cylinder made from titanium or aluminum, and fixing an upper bearing to the cylinder, the upper bearing having a bearing surface that provides sliding engagement with an outer surface of the piston.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
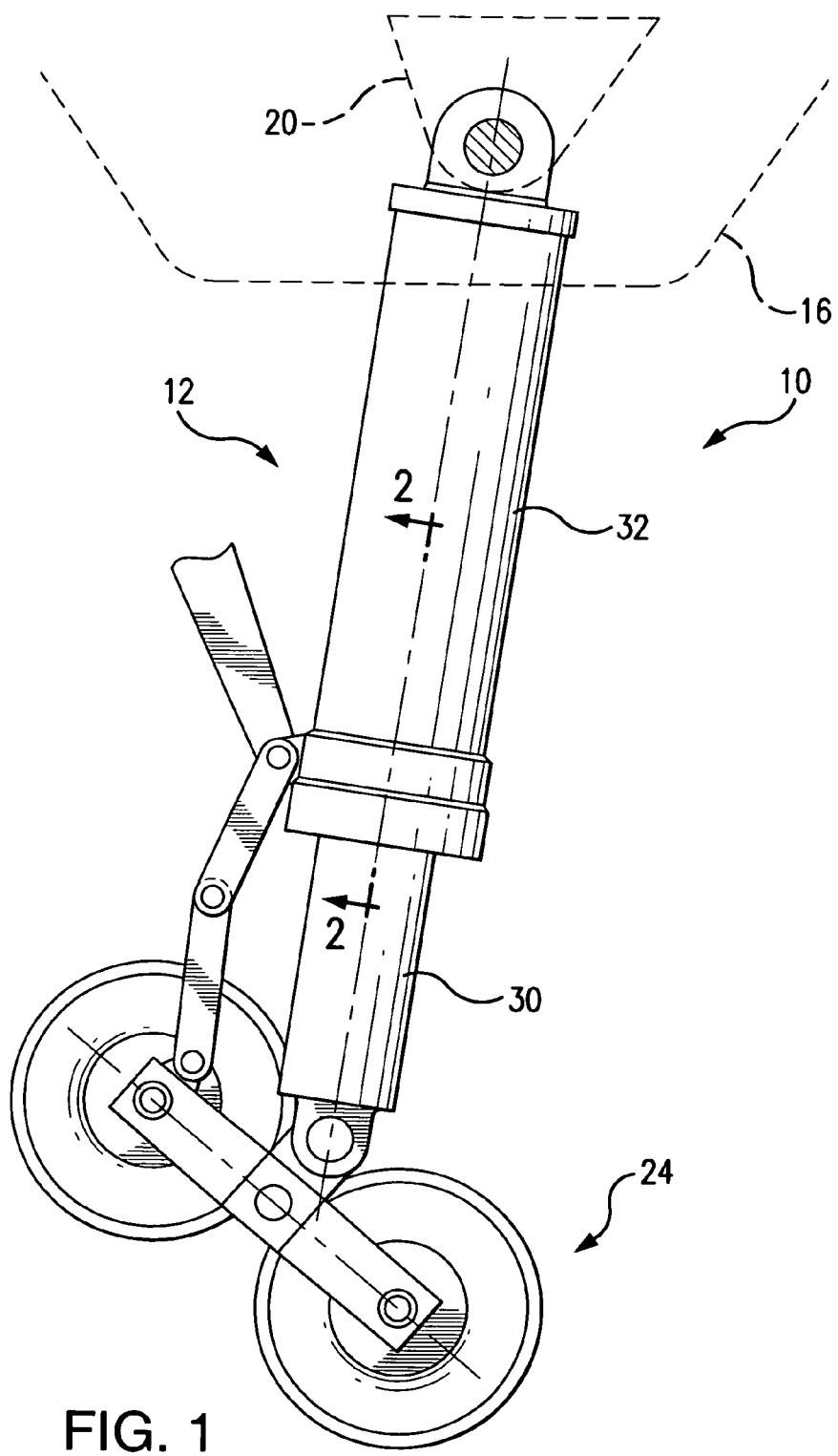
FIG. 1 is a schematic elevation view of a simplified landing gear assembly incorporating a shock strut in accordance with the present invention.

FIG. 1 presents a simplified aircraft landing gear assembly 10, including an exemplary aircraft shock strut 12, shown mounted at an upper end to an aircraft structure 16 by an attachment member 20. The references herein to a shock strut or an aircraft shock strut refer to shock struts employed in aircraft landing gear, e.g., nose landing gear, main landing gear, and the like (including cantilevered or articulated (pin-ended) versions). The lower end of the shock strut 12 is attached to a wheel assembly 24. The aircraft structure 16, attachment member 20 and wheel assembly 24 are shown in simple or outline form, while other structures, such as locking mechanisms and retracting mechanisms, are not shown in FIG. 1 in order to avoid obscuring the shock strut. Various arrangements of such structures are known in the art and are not critical to the description or understanding of the invention.

The shock strut 12 includes a piston 30 and a cylinder 32, which may be cylindrical as is customary, or some other shape, if desired. The shock strut is configured for attachment to the aircraft structure 16 and the wheel assembly 24 such that the piston communicates forces to and from the wheel assembly 24. The cylinder 32 receives the piston 30 in a manner that permits relative telescoping movement between the cylinder 32 and the piston 30 to absorb and dampen shock forces being transmitted to the aircraft structure 16. As is described more fully below, an upper bearing is fixed to the cylinder for providing sliding engagement between the cylinder 32 and the piston 30. Provision of an upper bearing fixed to the cylinder facilitates use of lighter weight materials for all or a portion of the cylinder 32.

It will be appreciated that the present invention is applicable to a variety of aircraft shock strut types and geometries. Because the detailed workings of a typical aircraft shock strut are understood by those of ordinary skill in the art, an overview of shock strut operation is provided for the sake of brevity. The piston 30 and the cylinder 32 generally define a sealed elongate chamber at least partially filled with a liquid, such as hydraulic fluid or oil. A portion of the chamber, e.g., an upper portion of the chamber, may be filled with a gas, such as nitrogen, as is common in an air-over-oil type of shock strut.

In operation, compression of the shock strut 12 causes the piston 30 to move into the cylinder 32, thereby reducing the volume of the sealed chamber, and compressing the portion filled with gas. The compressed gas stores energy in a manner similar to a spring. Relative telescoping movement of the piston into the cylinder pumps liquid from a generally lower dynamic liquid chamber, typically through an orifice plate, into a pneumatic chamber as the shock strut 12 is compressed, thereby increasing resistance to compression, while simultaneously dissipating compression energy. As the piston 30 moves into the cylinder 32, a metering pin moves into an orifice opening in the orifice plate, effectively reducing the flow area through the orifice opening and increasing resistance to further compression.

Part of the work expended in compressing the shock strut 12 is stored as recoverable spring energy in the portion filled with gas, which resiliently suspends the aircraft structure 16 while taxiing on the ground, and which also allows the piston and the cylinder to return to an extended position after the compression force is removed, such as after takeoff.

Figure 2:
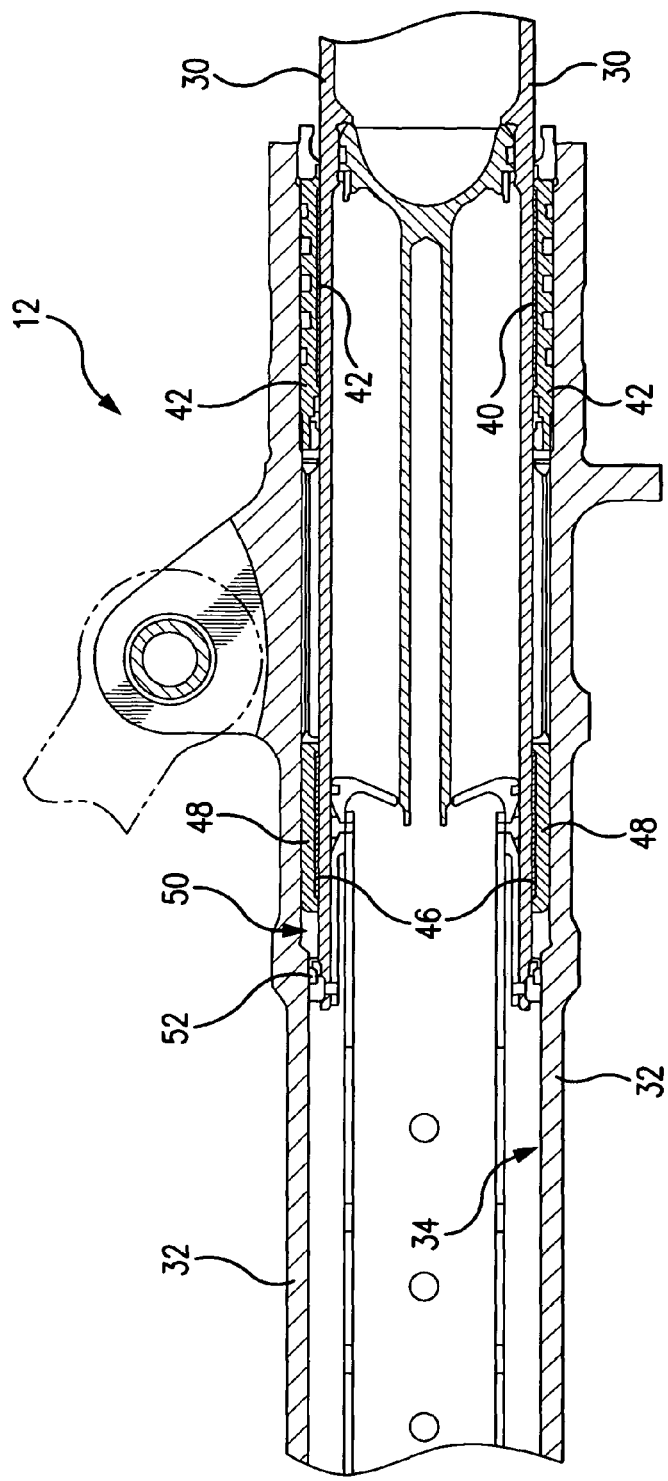
FIG. 2 is a partial cross-sectional view of the shock strut of FIG. 1 taken along the line 2-2 thereof.

Referring now to FIG. 2, a portion of an aircraft shock strut 12 is presented. As illustrated, the shock strut 12 includes a piston 30 and a cylinder 32 having an inner surface 34 for receiving the piston 30 in a manner that permits relative telescoping movement between the cylinder 32 and the piston 30, and defines there between an elongate chamber filled with a liquid and a gas.

A first bearing 40, e.g., a lower bearing, is disposed between the piston 30 and the cylinder 32. In the illustrated embodiment, the first bearing 40 is mounted, coupled or otherwise fixed to the cylinder 32, e.g., via a first bearing carrier 42, and has a bearing surface that contacts and provides sliding engagement with the piston 30. As illustrated, a second bearing 46, e.g., an upper bearing, is mounted, coupled or otherwise fixed to the cylinder 32, e.g., via a second bearing carrier 48. The second or upper bearing 46 has a bearing surface contacting and providing sliding engagement with the piston 30.

In a conventional shock strut where the upper bearing contacts and provides sliding engagement with the cylinder, the cylinder typically requires an adequate wear surface, such as a coating or a hard wear surface (e.g., as found in steel cylinders) to prevent premature failure. Steel is a heavy material, while the use of coatings may be costly and schedule drivers. Unlike the conventional shock strut, and as is described more fully below, the provision of an upper bearing that is fixed to the cylinder 32 facilitates use of lighter materials for the cylinder without the drawback of excessive or accelerated wear of the cylinder, e.g., the inner surface of the cylinder. Artisans will appreciate that the terms "excessive wear" or "excessive wearing" or "accelerated wear" or "accelerated wearing," as used herein, can refer to wear that is significantly greater than and/or faster than the wear experienced in conventional landing gear shock strut assemblies, Alternatively, "excessive wear" or "accelerated wear" can refer to wear that makes a given bearing-cylinder combination less or less than commercially viable.

In a preferred embodiment, the cylinder 32 is comprised of titanium. As used herein, the term "titanium" is intended to include titanium as well as any titanium alloy or titanium matrix composite that a skilled artisan would deem suitable for use in an aircraft landing gear shock strut. Suitable titanium alloys may include, but are not limited to, alpha/near alpha alloys, alpha+beta alloys, beta alloys and the like. In an exemplary embodiment, the cylinder is comprised of Ti 6-22-22 or Ti 10-2-3. Skilled artisans will appreciate that the above-mentioned titanium alloys are referred to by their common names. For example, the skilled artisan will appreciate that "Ti 6-22-22" is the common name for Ti-6Al-2Zr-2Sn-2Mo-2Cr-0.25Si. As mentioned above, the cylinder can be comprised of other suitable titanium alloys or titanium matrix composites without departing from the scope of the present invention. Further, the cylinder can be comprised of other light-weight materials (both metallic materials or composites and non-metallic materials or composites), e.g., aluminum, aluminum alloys, other alloys, other metal matrix composites, polymer composites or the like, that a skilled artisan would deem suitable for use in an aircraft landing gear shock strut.

In one embodiment, the inner surface 34 of the titanium or aluminum cylinder 32 is bare. As used herein, the term "bare" includes a surface that is not plated or otherwise coated by another metal or other wear-resistant material. By mounting or otherwise fixing the upper bearing 46 to the cylinder 32, rather than the piston 30 (as in conventional designs), the wear associated with the upper bearing running on the inner surface of the cylinder is eliminated. In turn, this facilitates use of lighter materials for the cylinder that may otherwise be impractical due to wear limitations.

In one embodiment, the piston is comprised of steel. Alternatively, the piston may be comprised of a lighter-weight material, e.g., titanium, aluminum or the like, that is plated, sputtered or otherwise coated with a suitable wear-resistant coating or sleeve, such as chrome, tungsten carbide, electroless nickel, nickel-boron or the like. Artisans will appreciate that providing a wear-resistant coating on an outside surface of a piston can be accomplished using any suitable process, such as sputtering, an HVOF (high velocity oxygen fuel) spray process or the like.

In the illustrated embodiment, the first and second bearings 40 and 46 are generally cylindrical in shape, corresponding to a generally cylindrical cylinder 32 and piston 30. However, it is to be appreciated that the first and/or second bearings can be of some other shape or geometry if the cylinder and piston are of some other shape or geometry, without departing from the scope of the present invention.

Figure 3:
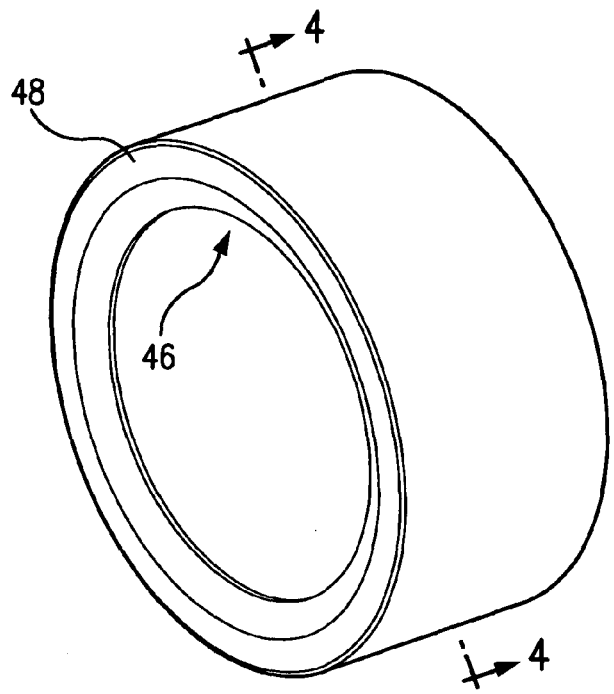
FIG. 3 is a perspective view of an exemplary upper bearing on an upper bearing carrier used in the shock strut of FIG. 1.
Figure 4:
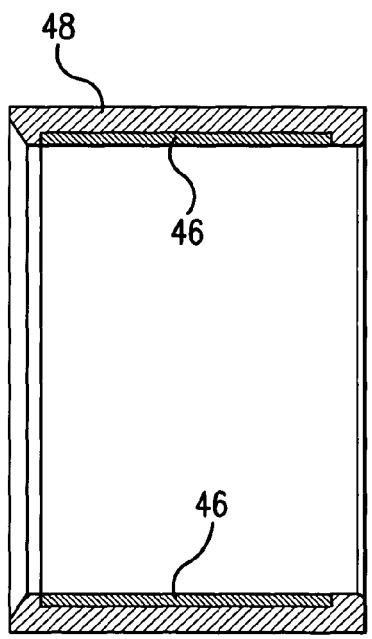
FIG. 4 is cross-sectional view of FIG. 3 taken along line 4-4.

Referring now to FIGS. 3 and 4, an exemplary upper bearing 46 in accordance with the present invention is illustrated. In the illustrated embodiment, the upper bearing 46 is generally cylindrical, e.g., in a sleeve configuration, and is configured to be mounted to or on an upper bearing carrier 48. The upper bearing carrier 48 is mounted to the cylinder 32 (FIG. 2), thereby coupling or otherwise fixing the upper bearing 46 to the cylinder 32. The bearing 46 is disposed radially inward in relation to the upper bearing carrier 48, e.g., on the inside diameter of the upper bearing carrier, with the bearing surface of the upper bearing 46 providing sliding engagement with an outer surface of the piston.

It is to be appreciated that the upper bearing carrier 48 may take any suitable geometry or configuration without departing from the scope of the present invention. For example, the upper bearing carrier may include one or more recesses and/ or protrusions for coupling to or otherwise mating with an inner surface of the cylinder. The upper bearing carrier can be made from any suitable material, including, but not limited to, steel, bronze, aluminum bronze, aluminum, low carbon steel, a metal-plated material, a non-metallic composite material or the like. In the illustrated embodiment, the upper bearing 46 is configured as a cylindrical sleeve mountable to the upper bearing carrier 48. Configuring the upper bearing 46 as a sleeve mountable to the upper bearing carrier 48 is useful for keeping the cost of the "wearing part" relatively low, while allowing for complexity in the configuration of the bearing carrier. Alternatively, the bearing can be single homogeneous piece made of the same material. That is, the bearing 46 and carrier 48 can be formed as a single piece made of a single material.

The upper bearing 46 may be comprised of any suitable material, including, but not limited to bronze, aluminum bronze, a non-metallic composite or the like. In an embodiment where the piston is comprised of titanium or aluminum (bare or coated with a wear-resistant coating), the bearing may be comprised of a non-metallic composite material, e.g., a suitable resin or engineered plastic, that is operable to slidingly engage the outer surface of the piston without creating excessive or accelerated wearing of the outer surface of the titanium or aluminum piston.

Returning now to FIG. 2, the shock strut 12 includes or otherwise defines a rebound damping chamber 50 within a volume created or otherwise defined by an inner surface of the cylinder and an outer surface of the piston between the upper bearing 46 and top of the piston. In addition, the shock strut includes a rebound damper valve 52, which controls fluid flow in and out of the rebound damping chamber 50 to provide rebound damping for the shock strut during normal operation. As the shock strut is compressed, the rebound damper valve 52 allows fluid, e.g., oil or hydraulic fluid, to pass between an upper portion of the piston and the upper bearing 46, which is fixed to the cylinder 32, i.e., allows fluid to pass into the rebound damping chamber 50. Once the shock strut begins to extend, the rebound damper valve 52 closes off, thereby creating a small aperture for the fluid to exit the rebound damping chamber 50. By restricting or otherwise controlling the flow of fluid out of the rebound damping chamber 50, the rebound damper valve 52 controls extension of the shock strut by slowing the extension rate of the piston.

The rebound damper valve may include any appropriate valve to provide the desired fluid flow control in and out of the rebound damping chamber during operation of the shock strut. In one embodiment, the rebound damper valve includes a friction valve that allows free flow of fluid during compression of the shock strut, and restricted flow during extension of the shock strut.

Figure 5:
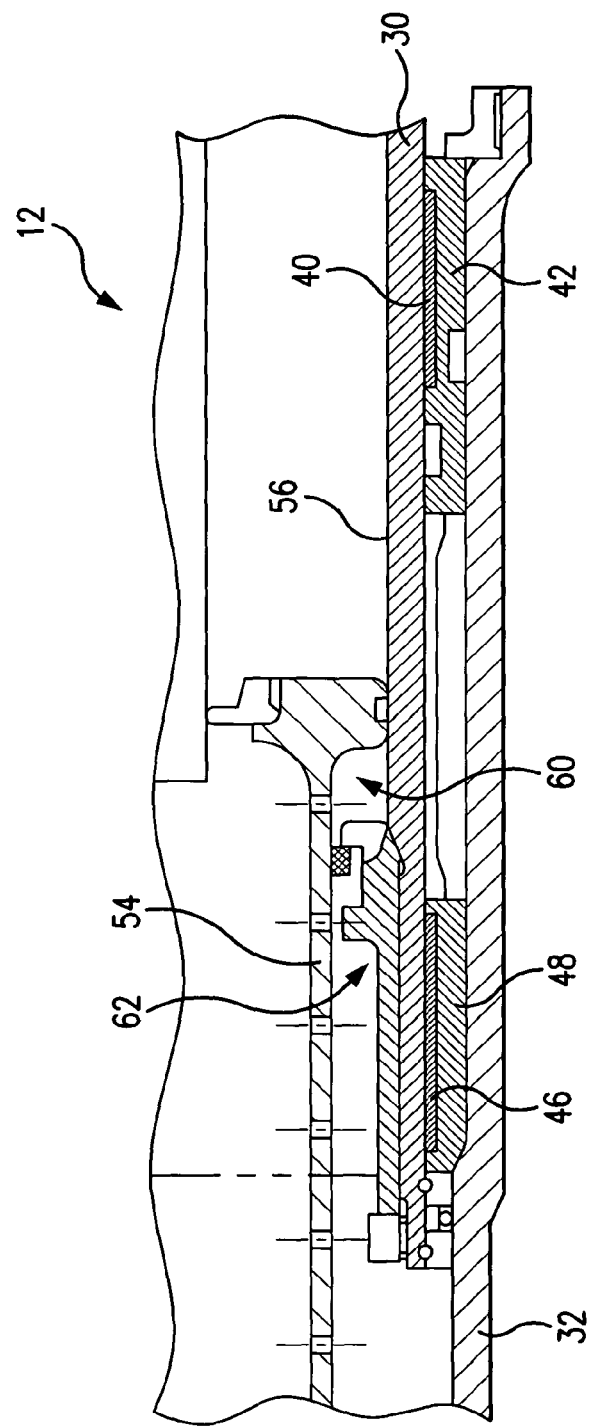
FIG. 5 is an enlarged partial cross-sectional view of an aircraft shock strut in accordance with an alternative exemplary embodiment.

Referring now to FIG. 5, a shock strut 12 in accordance with an alternative exemplary embodiment is depicted. This embodiment may be employed, for example, when rebound damping is a more significant factor in the overall shock strut design. As described above with respect to FIG. 2, the shock strut includes a piston 30 and a cylinder 32 having an inner surface for receiving the piston 30 in a manner that permits relative telescoping movement between the cylinder 32 and the piston.

The shock strut 12 includes a first bearing 40, e.g., a lower bearing, that is disposed between the cylinder and the piston. In the illustrated embodiment, the first bearing 40 is mounted or otherwise coupled to the cylinder 32 via a first bearing carrier 42, and has a bearing surface that contacts and provides sliding engagement with the piston 30. A second bearing 46, e.g., an upper bearing, is mounted, coupled or otherwise fixed to the cylinder 32, e.g., via a second bearing carrier 48. The second or upper bearing 46 has a bearing surface contacting and providing sliding engagement with an outer surface of the piston 30. Alternatively, the first and/or second bearing may be integrally formed without a separate bearing carrier.

In the illustrated embodiment, the piston 30 includes a support tube 54 (also referred to as an orifice support tube) and a piston wall 56. The shock strut 12 includes or otherwise defines a rebound damping chamber 60 within a volume between the outside of the support tube 54 and an inside of the piston wall 56 between the support tube that rides on the inside of the piston wall 56 and a rebound damper valve assembly 62 that rides on the outside of the support tube 54. The rebound damper valve assembly 62 controls fluid flow in and out of the rebound damping chamber 60 to provide rebound damping to the shock strut during normal operation. As the shock strut is compressed, the rebound damper valve 62 allows fluid, e.g., oil or hydraulic fluid, to flow between the outside of the support tube 54 and the piston wall 56, i.e., allows fluid to flow into the rebound damping chamber 60. Once the shock strut begins to extend, the rebound damper valve assembly 62 closes off, thereby providing only a small aperture for the fluid to exit the rebound damping chamber 60. By restricting or otherwise controlling the flow of fluid out of the rebound damping chamber 60, the rebound damper valve assembly 62 controls extension of the shock strut by slowing the extension rate of the piston.

The rebound damper valve may include any appropriate valve to provide the desired fluid flow control in and out of the rebound damping chamber during operation of the shock strut. In one embodiment, the rebound damper valve includes a friction valve that allows free flow of fluid during compression of the shock strut, and restricted flow during extension of the shock strut.

One benefit of the rebounding damping assembly designs depicted in FIG. 5 is that the inlet to the rebound damping chamber can be directly above the main compression damping orifice, allowing the rebound damping chamber to fill during shock strut compression with less fluid in the shock strut. Another benefit of the rebound damping design depicted in FIG. 5 is that variable rebound damping can be introduced more easily if there is some special need to allow near free extension at some stroke positions, and more damped extension at other stroke positions.

As used herein, the terms "upper" and "lower," such as "upper bearing" and "lower bearing," refer to relative position, and are intended to facilitate explanation of the invention. It is not intended to limit the invention to any specific orientation of the aircraft shock strut unless otherwise indicated.

Although the invention has been shown and described with respect to certain illustrated embodiment, equivalent alterations and modifications will occur to others skilled in the art upon reading and understanding the specification and the annexed drawings. For example, although an embodiment of the invention directed to an aircraft strut is described, a shock absorber provided by the present invention may have other applications other than aeronautical applications. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiments of the invention.

What is claimed is:

1. An aircraft shock strut comprising:
    a cylinder having opposed upper and lower end portions and an inner surface for receiving a piston in a manner that permits telescoping movement between the cylinder and piston;
    a piston telescopically movable within the cylinder;
    a lower bearing associated with the lower end portion of the cylinder and an upper bearing associated with the upper end portion of the cylinder, the lower and upper bearings providing sliding engagement between the cylinder and the piston; and
    an upper bearing carrier coupled to the inner surface of the cylinder, wherein the upper bearing is fixed to the cylinder by way of the upper bearing carrier and has a bearing surface that provides sliding engagement with the piston.

2. An aircraft shock strut according to claim 1, wherein the upper bearing carrier includes means for coupling to the inner surface of the cylinder.

3. An aircraft shock strut according to claim 1, wherein the cylinder is comprised of titanium.

4. An aircraft shock strut according to claim 1, wherein the cylinder is comprised of aluminum.

5. An aircraft shock strut according to claim 1, wherein at least an inner surface of the cylinder is bare titanium.

6. An aircraft shock strut according to claim 1, wherein at least an inner surface of the cylinder is bare aluminum.

7. An aircraft shock strut according to claim 1, further comprising a rebound damping chamber disposed between the upper bearing and a top portion of the piston, the rebound damping chamber being defined by an inner surface of the cylinder and an outer surface of the piston.

8. An aircraft shock strut according to claim 7, further comprising a rebound damper valve assembly on an inside wall of the piston and disposed above the upper bearing, the rebound damper valve assembly being configured to allow fluid flow into the rebound damping chamber during shock strut compression, and limiting fluid flow out of the rebound damping chamber during shock strut extension.

9. An aircraft shock strut according to claim 1, wherein the piston includes a support tube and an outer wall, the shock strut further comprising a rebound damping chamber disposed above the lower bearing, the rebound damping chamber being defined by an outer surface of the support tube and an inner surface of the outer wall.

10. An aircraft shock strut according to claim 9, further comprising a rebound damper valve attached to the support tube and disposed above the lower bearing, the rebound damper valve allowing fluid flow into the rebound damping chamber during shock strut compression, and limiting fluid flow out of the rebound damping chamber during shock strut extension.

11. An aircraft shock strut according to claim 1, wherein the piston is comprised of titanium.

12. An aircraft shock strut according to claim 1, wherein the piston is comprised of titanium including a wear-resistant coating.

13. An aircraft shock strut according to claim 1, wherein the lower bearing is mounted to the cylinder, the lower bearing having a lower bearing surface that provides sliding engagement with an outer surface of the piston.

14. An aircraft landing gear assembly including the aircraft shock strut of claim 1.

15. The landing gear assembly according to claim 14, wherein the landing gear assembly is a nose landing gear assembly.

16. The landing gear assembly according to claim 14, wherein the landing gear assembly is a main landing gear assembly.

17. A method of reducing weight of an aircraft landing gear including at least one shock strut, the at least one shock strut including a cylinder and a piston telescopically movable within the cylinder, the method comprising:
    providing a cylinder made from titanium or aluminum;
    fixing an upper bearing to an upper bearing carrier; and
    coupling the upper bearing carrier to the cylinder, the upper bearing having a bearing surface that provides sliding engagement with an outer surface of the piston.

18. The method according to claim 17, wherein the bearing surface of the upper bearing provides sliding engagement with the outer surface of the titanium or aluminum cylinder without causing excessive or accelerated wear of the outer surface of the titanium or aluminum cylinder.

* * * * *